United States Patent
Hampe, Jr.

(10) Patent No.: US 12,202,608 B2
(45) Date of Patent: Jan. 21, 2025

(54) AIRFLOW DIVERTER FOR AIRCRAFT AND METHOD OF USE

(71) Applicant: Clark C. Hampe, Jr., Tyler, TX (US)

(72) Inventor: Clark C. Hampe, Jr., Tyler, TX (US)

(*) Notice: Subject to any disclaimer, the term of this patent is extended or adjusted under 35 U.S.C. 154(b) by 0 days.

(21) Appl. No.: 18/515,251

(22) Filed: Nov. 20, 2023

(65) Prior Publication Data
US 2024/0083585 A1 Mar. 14, 2024

Related U.S. Application Data

(60) Division of application No. 16/842,519, filed on Apr. 7, 2020, now Pat. No. 11,820,518, which is a continuation-in-part of application No. 15/369,837, filed on Dec. 5, 2016, now Pat. No. 10,611,486.

(51) Int. Cl.
*B64D 13/06* (2006.01)
*F24F 13/065* (2006.01)
*B64D 13/00* (2006.01)

(52) U.S. Cl.
CPC ............ *B64D 13/06* (2013.01); *F24F 13/065* (2013.01); *B64D 2013/003* (2013.01)

(58) Field of Classification Search
CPC .. F24F 13/065; F24F 13/0227; F24F 2221/38; B60H 1/00564; B60H 1/3414; B64D 2013/003; B64D 13/06
See application file for complete search history.

(56) References Cited

U.S. PATENT DOCUMENTS

| | | |
|---|---|---|
| 1,624,226 A | 4/1927 | Elters |
| 2,161,001 A | 6/1939 | Bedol |
| 2,755,638 A | 7/1956 | Sevin |
| 2,824,575 A | 2/1958 | Shy |
| 3,225,679 A | 12/1965 | Meyer |
| 3,550,522 A | 12/1970 | Bauer et al. |
| 3,553,343 A | 1/1971 | Garlington |

(Continued)

FOREIGN PATENT DOCUMENTS

| | | |
|---|---|---|
| AU | 781083 | 11/2001 |
| CA | 2207808 | 12/1997 |

(Continued)

OTHER PUBLICATIONS

"Air Deflectors,"Lowe's, lowes.com, accessed: Aug. 2016, 2 pages.

(Continued)

*Primary Examiner* — Philip J Bonzell
(74) *Attorney, Agent, or Firm* — Schultz & Associates, P.C.

(57) ABSTRACT

Disclosed is a stowable airflow diverter for removable attachment to a floor vent of a turbine aircraft. The air diverter comprises vertical ducting extending from a base. A flexible gasket and magnets are attached to the base for engagement with the floor vent. A nozzle attached to the vertical ducting redirects the airflow emanating from the floor vent from horizontal to vertical in order to direct air conditioned air into the cock pit of the aircraft. In an alternate embodiment, the nozzle is rotatable with respect to the vertical axis of the duct. In another alternate embodiment, the nozzle and vertical duct comprise telescoping segments such that the device can be collapsed into the floor vent.

15 Claims, 11 Drawing Sheets

(56) References Cited

U.S. PATENT DOCUMENTS

| | | |
|---|---|---|
| 4,020,753 A | 5/1977 | Efstratis |
| 4,501,195 A | 2/1985 | Held |
| 4,850,266 A | 7/1989 | Bennett |
| 4,967,646 A | 11/1990 | Brown |
| 5,044,259 A | 9/1991 | Catan et al. |
| 5,095,942 A | 3/1992 | Murphy |
| 5,498,203 A | 3/1996 | Reichert |
| 5,851,144 A | 12/1998 | Nystrom |
| 6,050,892 A | 4/2000 | Sodec |
| 6,929,542 B1 | 8/2005 | Stravitz |
| 7,022,011 B1 | 4/2006 | Rickman |
| 7,410,416 B2 | 8/2008 | Fettkether |
| 9,644,859 B2 | 5/2017 | Migliore et al. |
| 9,657,962 B2 | 5/2017 | Mosley |
| 9,889,939 B2 | 2/2018 | Zhang et al. |
| 2003/0173056 A1 | 9/2003 | Mccauley |
| 2007/0213001 A1 | 9/2007 | Vander |
| 2007/0281601 A1 | 12/2007 | Hammonds |
| 2008/0093843 A1 | 4/2008 | Noroozi et al. |
| 2008/0160904 A1 | 7/2008 | Yi et al. |
| 2008/0233855 A1 | 9/2008 | Baudouin et al. |
| 2009/0081941 A1 | 3/2009 | Reynolds |
| 2011/0009045 A1* | 1/2011 | Beckley ............ B60H 1/00564 <br> 454/162 |
| 2012/0118422 A1 | 5/2012 | Rotell |
| 2012/0156982 A1 | 6/2012 | Desouza |
| 2013/0281003 A1 | 10/2013 | Newcomer |
| 2014/0030976 A1 | 1/2014 | Spalding |
| 2014/0206275 A1 | 7/2014 | Ngo |
| 2015/0111486 A1 | 4/2015 | Migliore |
| 2015/0241082 A1 | 8/2015 | Mosley |

FOREIGN PATENT DOCUMENTS

| | | | |
|---|---|---|---|
| CA | 2207900 | | 12/1997 |
| CA | 2453882 | | 9/2008 |
| CN | 104379980 | | 2/2015 |
| CN | 113247268 | | 8/2021 |
| EP | 2578424 | | 4/2013 |
| JP | 3140275 U | | 3/2008 |
| KR | 20140044183 A | * | 4/2014 ............ F24F 13/08 |

OTHER PUBLICATIONS

"Telescopic Underfloor Vent," Manthorpe Building Products, www.manthorpe.co.uk, accessed: Sep. 2, 2016, 2 pages.

* cited by examiner

AIRFLOW DIVERTER FOR AIRCRAFT AND METHOD OF USE

CROSS REFERENCE TO RELATED APPLICATIONS

This application is a divisional of U.S. application Ser. No. 16/842,519, filed Apr. 7, 2020, now U.S. Pat. No. 11,820,518 granted on Nov. 21, 2023, which is a continuation-in-part of U.S. application Ser. No. 15/369,837, filed Dec. 5, 2016, now U.S. Pat. No. 10,611,486 granted on Apr. 7, 2020. The patent applications identified above are incorporated here by reference in their entirety to provide continuity of disclosure.

FIELD OF THE INVENTION

The present disclosure relates generally to aircraft ventilation and air conditioning systems. In particular, the present disclosure relates to a temporary airflow duct system that redirects environmental air from a floor vent directly into a cockpit of an aircraft.

BACKGROUND OF THE INVENTION

A typical corporate turbine aircraft environmental control system includes pressurization and temperature and generally is a function of bleed air introduced into the aircraft cabin from the engines. Since bleed air is hot, ambient ram air available during flight is usually used to cool it before use.

Two devices are commonly used for cooling engine bleed air, air cycle machines (ACM) and vapor cycle machines (VCM) or Freon units.

In an ACM, high pressure bleed air from the engines is passed through a compressor and then routed through a heat exchanger which is exposed to cold ram air to remove heat. An expansion chamber may be added to further cool the bleed air.

In a VCM, refrigerant such as Freon is compressed with a separate compressor into a hot high pressure liquid. The hot high pressure liquid is then drawn through an evaporator which interacts with cabin air through a heat exchanger. As the refrigerant evaporates, the heat exchanger cools the environmental air which is then routed to the cabin through a series of ducts.

In many cases, both ACMs and VCMs are installed and work together to provide environmental air to the cabin. However, neither the ACM nor the VCM is typically designed to work for long periods of time efficiently when the aircraft is on the ground. For example, the ACM requires ram air of extremely low temperature at high altitude in order to work efficiently. Similarly, VCM requires external cold air to augment the removal of heat from the heat exchanger. When cold ram air is not present, such as when the aircraft is on the ground, the efficiency of each system is reduced thereby increasing the temperature of environmental air to the cabin.

Air handling systems from VCRs typically rely on low voltage electric motors which drive impellers to circulate environmental air through the heat exchangers and return it to the cabin. However, the impellers are typically not designed for prolonged use alone and do not have high capacity.

Because of the reduced efficiency of the ACM and VCM while the aircraft is on the ground, environmental temperatures inside a cabin can reach uncomfortable levels if the air craft is required to be on the ground for long periods of time.

FIG. 1 shows the interior of a turbine aircraft of the prior art. The problem of cabin warming can be exacerbated by low airflow due to the improper duct placement. A typical ducting system for a turbine aircraft comprises a set of nozzles 102 at fixed overhead locations. These "face nozzles", as they are known, operate only when the aircraft is in flight. In some aircraft, forward vents 104 are used to supply environmental air at temperature while the air craft is on the ground. However, these floor vents only supply environmental air in the center of the cabin, thereby reducing the airflow to the passengers and crew. Further, air return ducts are generally in the rear of the aircraft. Therefore, environmental air that is supplied by the forward floor vent is often drawn away by the rear return duct before proper circulation can be achieved.

FAA regulations require that air vents located in the floor of the aircraft be flush with the floor so as not to present a tripping hazard during an evacuation. As a result, cabin air directed upward from the floor vent is diffused into the surrounding cabin rather quickly, which reduces the air flowrate and apparent cooling to the passengers and crew.

As a result, there is a need for an airflow diverter that can redirect environmental air from a forward floor vent while the environmental system is operating at low capacity while the aircraft on the ground.

There is also a need for an air flow diverter that is in compliance with FAA standards for aisle safety and which does not present a tripping hazard.

The prior art discloses various venting devices intended to redirect airflow. Disadvantages of the prior art such as bulky components, complicated construction, and high manufacturing cost that make them ineffective solutions for the airflow problems of a corporate turbine aircraft.

For example, U.S. Patent Publication No. 2015/0241082 to Mosley discloses a tower floor register that replaces the standard in-floor register. The device comprises a plenum chamber base connected to stackable tower sections. Directional vents are attached to the top tower section. The base is permanently inserted into the floor opening. The tower can be stacked to different heights in order to clear an obstruction such as furniture.

U.S. Patent Publication No. 2009/0081941 to Reynolds discloses a floor vent attachment for redirecting airflow from a floor vent to avoid obstructions such as furniture. The device comprises a floor vent cover that is removably attached to a floor vent with magnets. An adjustable, flexible tubing is attached to the vent cover. A screen cover is affixed to the end of the flexible hose.

Japanese Publication No. JP 3140275U to Chong discloses a vertically oriented telescoping ventilation pipe for moving air between the floor and the ceiling of a room. The device is designed to move warm air from the ceiling down to the floor and cool air from the floor up to the ceiling. A ceiling register is connected to a floor register by the telescoping ventilation pipe. A reversible blower is integrated into the ventilation pipe to affect the direction of air flow.

However, none of these devices provide the many advantages of a stowable airflow redirect system as described.

Hence, there remains a need for an easily installed device for diverting cool air from the floor vent of a turbine aircraft for use while it is on the ground. Such a device should divert the cool air from the floor vent upward and directly into the cockpit area but yet be easily removable for cockpit exit safety.

SUMMARY OF THE INVENTION

In a first embodiment, the device comprises a rigid vertical duct extending from a base flange. A coupling connects the base flange to the fixed vertical duct. The base flange includes a master surface which removably connects it to a vent frame. A flexible gasket is attached to and surrounds the perimeter of the base flange. The vertical duct terminates at a rigid 90° nozzle.

In an alternate embodiment, the nozzle may be rotated about a rotary coupling.

In an alternate embodiment, the duct comprises a series of telescoping sections. A flexible nozzle section redirects environmental air. The sections collapse and are stored within the vent frame such that the duct is flush with the aircraft floor.

Those skilled in the art will appreciate the above-mentioned features and advantages of the disclosure together with other important aspects upon reading the detailed description that follows in conjunction with the drawings.

DETAILED DESCRIPTION OF THE INVENTION

In the description that follows, like parts are marked throughout the specification and figures with the same numerals, respectively. The figures are not necessarily drawn to scale and may be shown in exaggerated or generalized form in the interest of clarity and conciseness.

Figure 1:
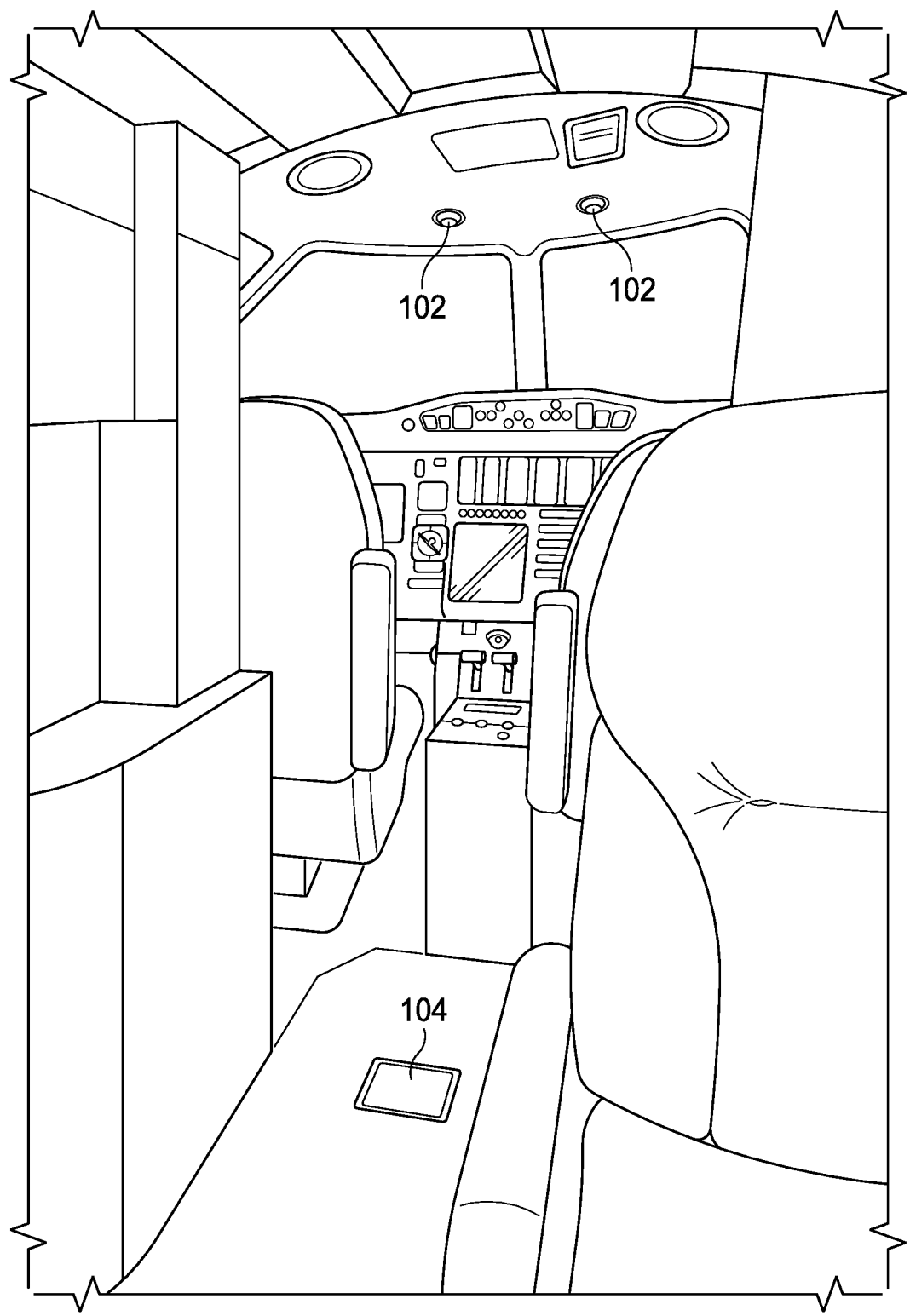
FIG. 1 is a picture of a typical cockpit of a corporate turbine aircraft showing a forward floor vent and face nozzles.
Figure 2A:
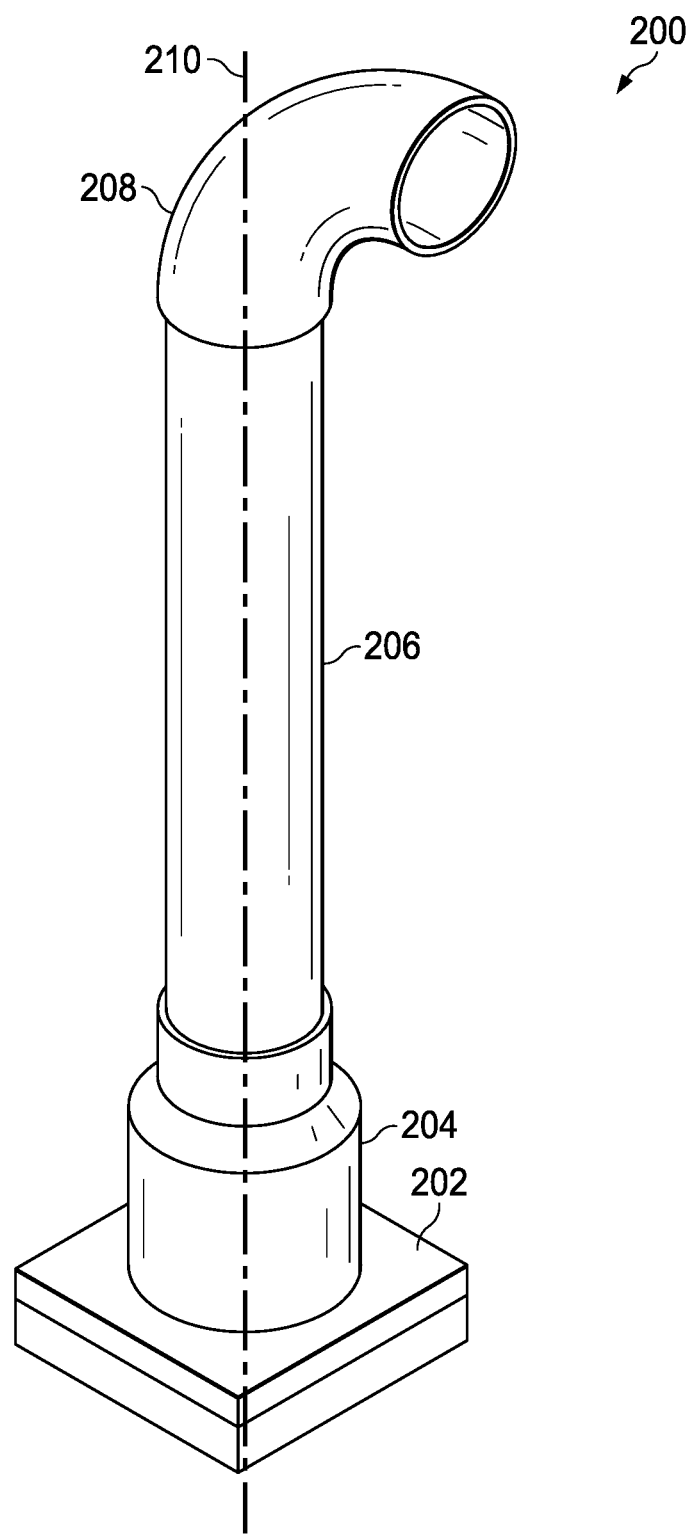
FIG. 2A is an isometric view of a preferred embodiment.

Referring to FIG. 2A, air diverter 200 comprises base 202 rigidly connected to coupling 204. Coupling 204 is rigidly connected to duct 206. Duct 206 is rigidly connected to nozzle 208. In a preferred embodiment, base 202 is formed in a square to match a typical environment vent frame to which the device will be applied. The base may conform to other common shapes. Coupling 204, duct 206, and nozzle 208 are preferably cylindrical, however other cross-sectional shapes are envisioned. In a preferred embodiment, all connections are made with a suitable aircraft grade epoxy. In a preferred embodiment, base 202, coupling 204, duct 206, and nozzle 208 are made of polystyrene, polyvinyl chloride (PVC), or nylon. Light aluminum or an aluminum magnesium alloy are also preferable.

A preferable height of air diverter 200 from base 202 to nozzle 208 can range, depending on application, from two to four feet but may vary depending on the aircraft. Base 202 preferably has dimensions that are approximately one to two inches larger than the dimensions of a floor vent frame. The diameters of duct 206 and nozzle 208 preferably range from three to four inches. Duct 206 and nozzle 208 should provide free flow of the environmental air coming from the floor vent. In one embodiment, this flow is approximately 300-400 CFM.

Figure 2B:
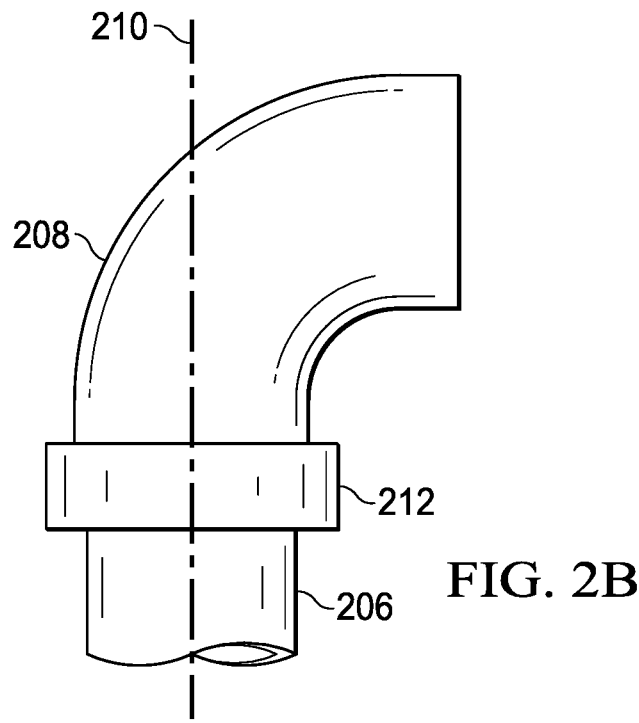
FIG. 2B is a side view of an alternate embodiment of a nozzle.

In an alternate embodiment shown in FIG. 2B, nozzle 208 is connected to duct 206 by rotary collar 212. Rotary collar 212 allows nozzle 208 to be rotated with respect to duct 206 about longitudinal axis 210.

Figure 2C:
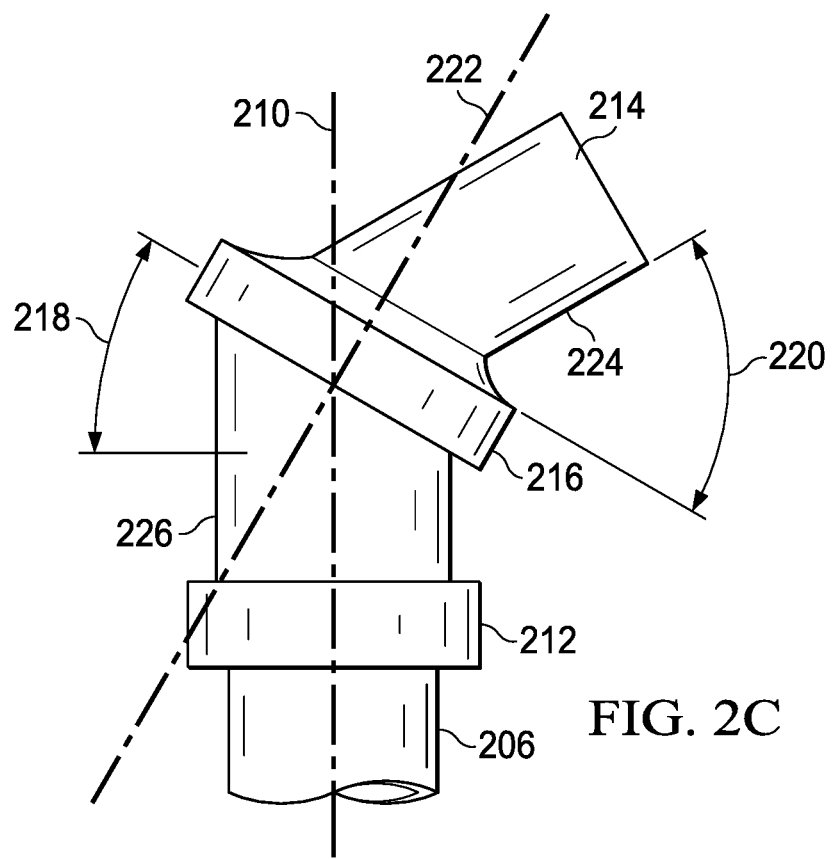
FIG. 2C is a side view of an alternate embodiment of a nozzle.

In an alternate embodiment shown in FIG. 2C, nozzle 214 is connected to duct 206 by rotary collar 212. Rotary collar 212 allows nozzle 208 to be rotated with respect to duct 206 about longitudinal axis 210. Nozzle 214 comprises upper section 224 connected to lower section 226 by rotary collar 216 at angle 218. Rotary collar 216 allows upper section 224 to be rotated with respect to lower section 226 about axis 222. Axis 222 is generally perpendicular to rotary collar 216. Angle 218 is preferably about 45° but can range from 30° to 60°. Upper section 224 extends from rotary collar 216 at angle 220. Angle 220 is preferably about 45° but can range from 30° to 60°. The combination of angles 218 and 220 allow the airflow directed by nozzle 214 to be adjusted from directly vertical to generally horizontal and all angles in between.

The nozzles and rotary collars can be used with any of the embodiments disclosed.

Figure 3:
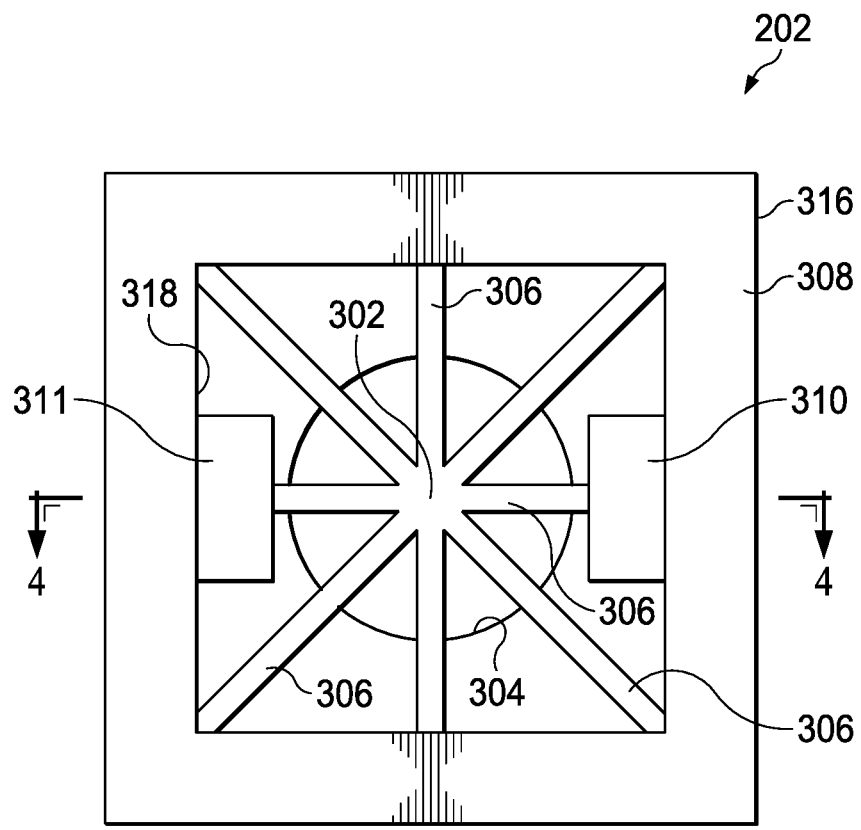
FIG. 3 is a bottom view of a base of a preferred embodiment.

Referring to FIG. 3, the underside of base 202 is shown. Base 202 comprises flange 302 integrally formed with riser 304. Riser 304 is cylindrical and engages coupling 204. Flange 302 includes a plurality of radial slats 306. The slats serve to strengthen the flange and also prevent debris from entering the floor vent. Gasket 308 is attached around the perimeter of flange 302. The gasket seals the junction between air diverter 200 and the floor vent frame. In a preferred embodiment, gasket 308 is flexible foam rubber. Gasket 308 has outer perimeter 316 that generally matches the perimeter of base 202. Gasket 308 has inner perimeter 318 that generally matches the perimeter of the floor vent frame. Magnets 310 and 311 are connected to flange 302. In a preferred embodiment, the magnets are a rubber/ferrite powder mixture dispersed in a flexible plastic substitute that is laminated on both sides to resist corrosion. Each magnet has a contact surface area that ranges from about 2 to 3 in t and a generated force of about 10 pounds per linear foot. In one preferred embodiment, the magnets are 0.5 inches in width and 0.06 inches in height. In another preferred embodiment, the magnets may be flat neodymium rare earth magnets available from CMS Magnetics. These magnets generate approximately 80 pounds force per linear foot and are ideal for high traffic applications.

Figure 4:
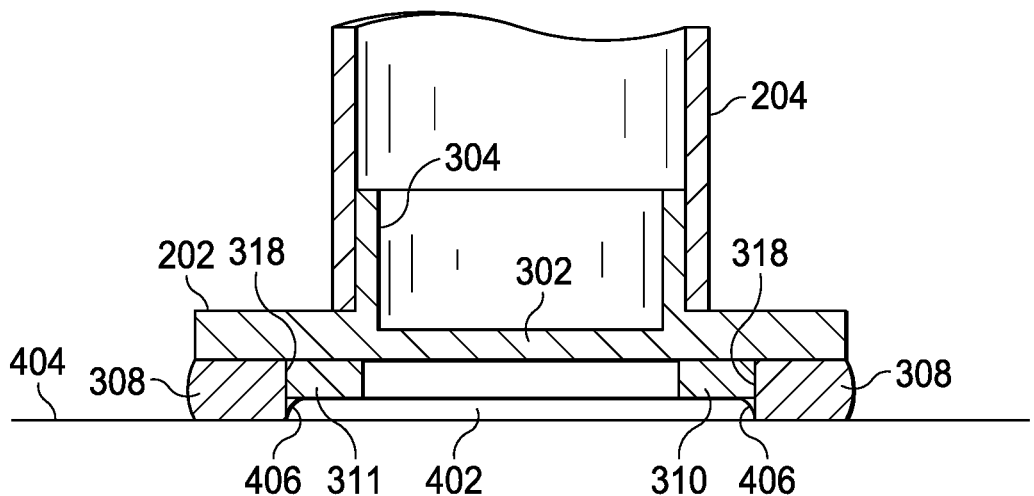
FIG. 4 is a partial cut away view taken along line 4-4 of FIG. 3 of a base of a preferred embodiment attached to a floor vent.

Referring to FIG. 4, base 202 is shown removably affixed to floor vent frame 402. Floor vent frame 402 slightly extends from floor 404 and is typically constructed of a magnetic alloy. Floor vent frame 402 has outer perimeter 406. When air diverter 200 is attached to floor vent frame 402, gasket 308 completely surrounds floor vent frame 402 such that inner perimeter 318 is adjacent outer perimeter 406. Magnets 310 and 311 are adjacent floor vent frame 402 and magnetically affix base 202 to floor vent frame 402. Riser 304 extends from flange 302 and engages coupling 204.

Figure 5:
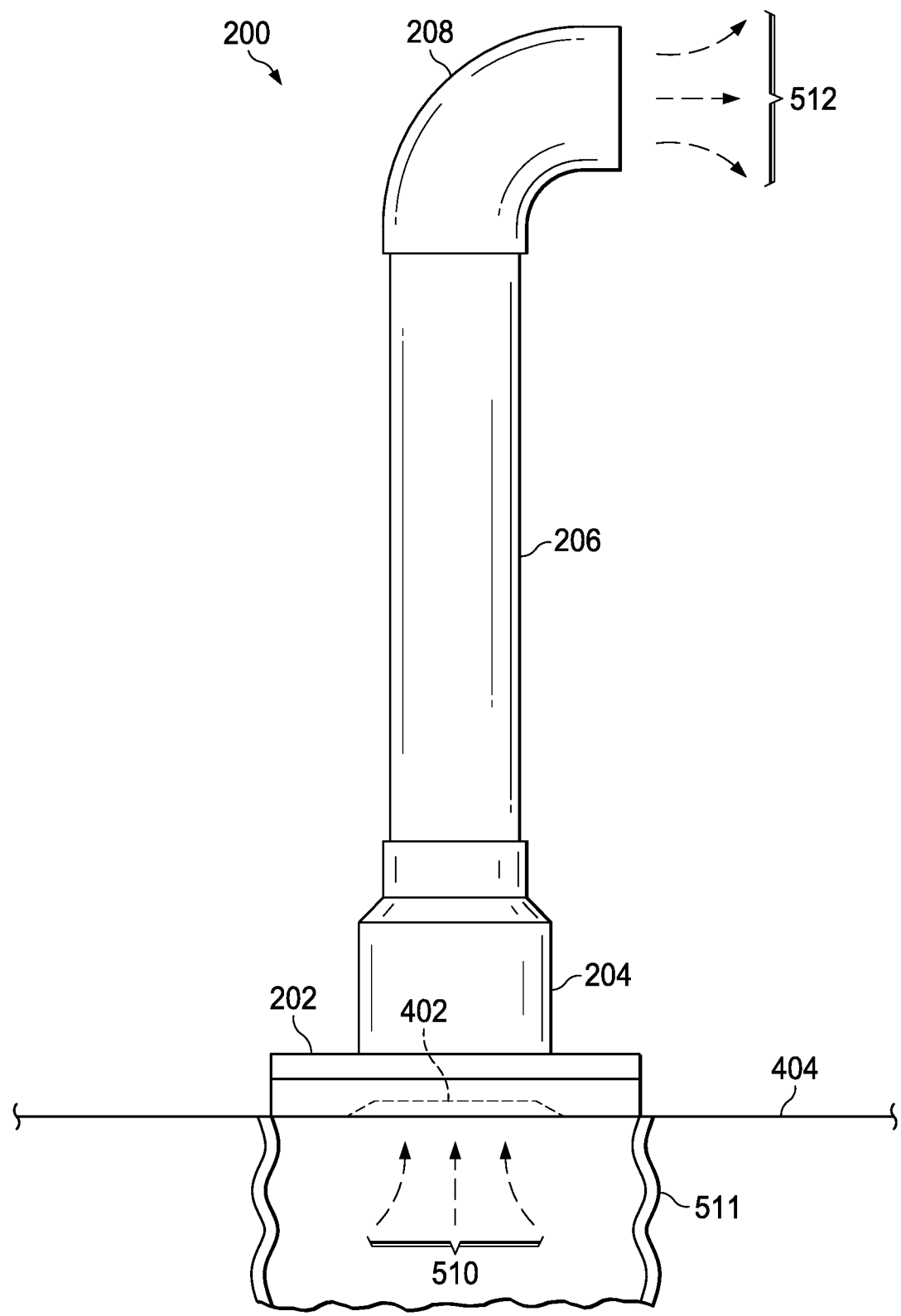
FIG. 5 is a side view of a preferred embodiment in use.

Referring to FIG. 5, in use, air diverter 200 is attached to floor vent frame 402. Nozzle 208 is directed towards the aircraft cockpit. Conditioned air 510 from cabin supply duct 511 flows through floor vent frame 402 to base 202, coupling 204, duct 206, and nozzle 208. Nozzle 208 redirects the cabin air into forward flow 512. In an alternate embodiment, nozzle 208 is rotated about longitudinal axis 210 through the use of rotary collar 212 in order to alter the cabin air flow direction. In an alternate embodiment, nozzle 214 is rotated about longitudinal axis 210 through the use of rotary collar 212 and rotated about axis 222 through the use of rotary collar 216 in order to alter the cabin air flow direction. When the aircraft is ready for takeoff, air diverter 200 can easily be removed from engagement with floor vent frame 402 and appropriately stowed such that floor vent frame 402 can operate normally.

Figure 6A:
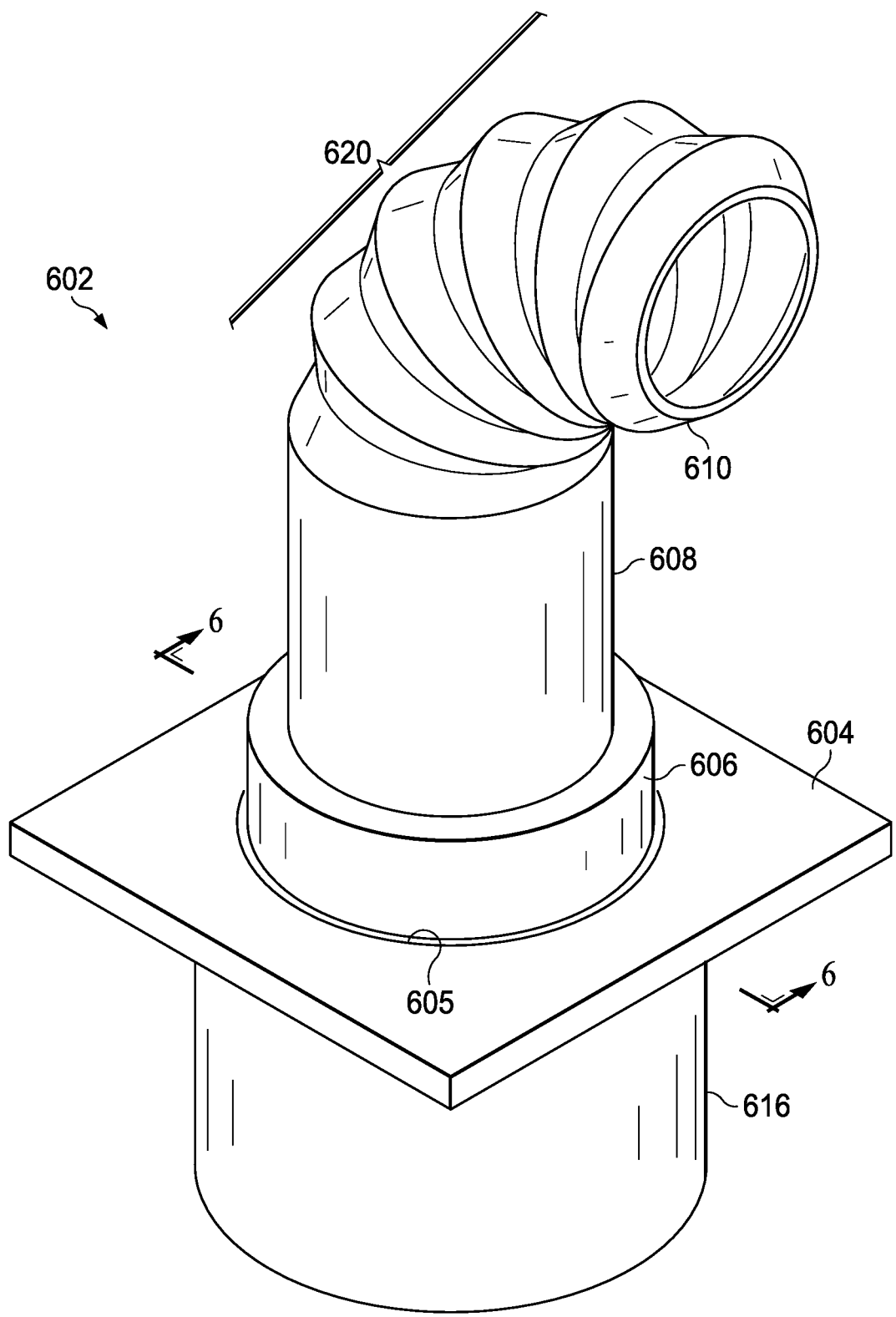
FIG. 6A is an isometric view of an alternate embodiment in extended position.

Referring to FIG. 6A, an alternate embodiment will be described.

Flare 604 is formed into a flat plate in which base opening 605 is formed. First vertical stanchion 606 is positioned within base opening 605. Second vertical stanchion 608 is positioned within first vertical stanchion 606. Flex nozzle 610 is ductedly connected to second vertical stanchion 608 via flexible section 620. In a preferred embodiment, the flexible section is comprised of corrugated drain pipe approximately three inches in diameter. In preferred embodiments, the corrugated drain pipe may be obtained at Marelton Cross Limited of the U.K. Flare 604 is connected to storage chamber 616. Storage chamber 616 is cylindrical but in alternate embodiments, other shapes will suffice. First vertical stanchion 606, second vertical stanchion 608, and flex nozzle 610 extend from and can all collapse within storage chamber 616. When extended, the vertical stanchions are held in place by an interference fit between them. In other embodiments, the vertical stanchions are held in place by magnetic and ferrous collars, as will be further described. In other embodiments, there may be a fewer or greater number of vertical stanchions. The flexible section when repositioned is held in place by the memory of the corrugation.

Figure 6B:
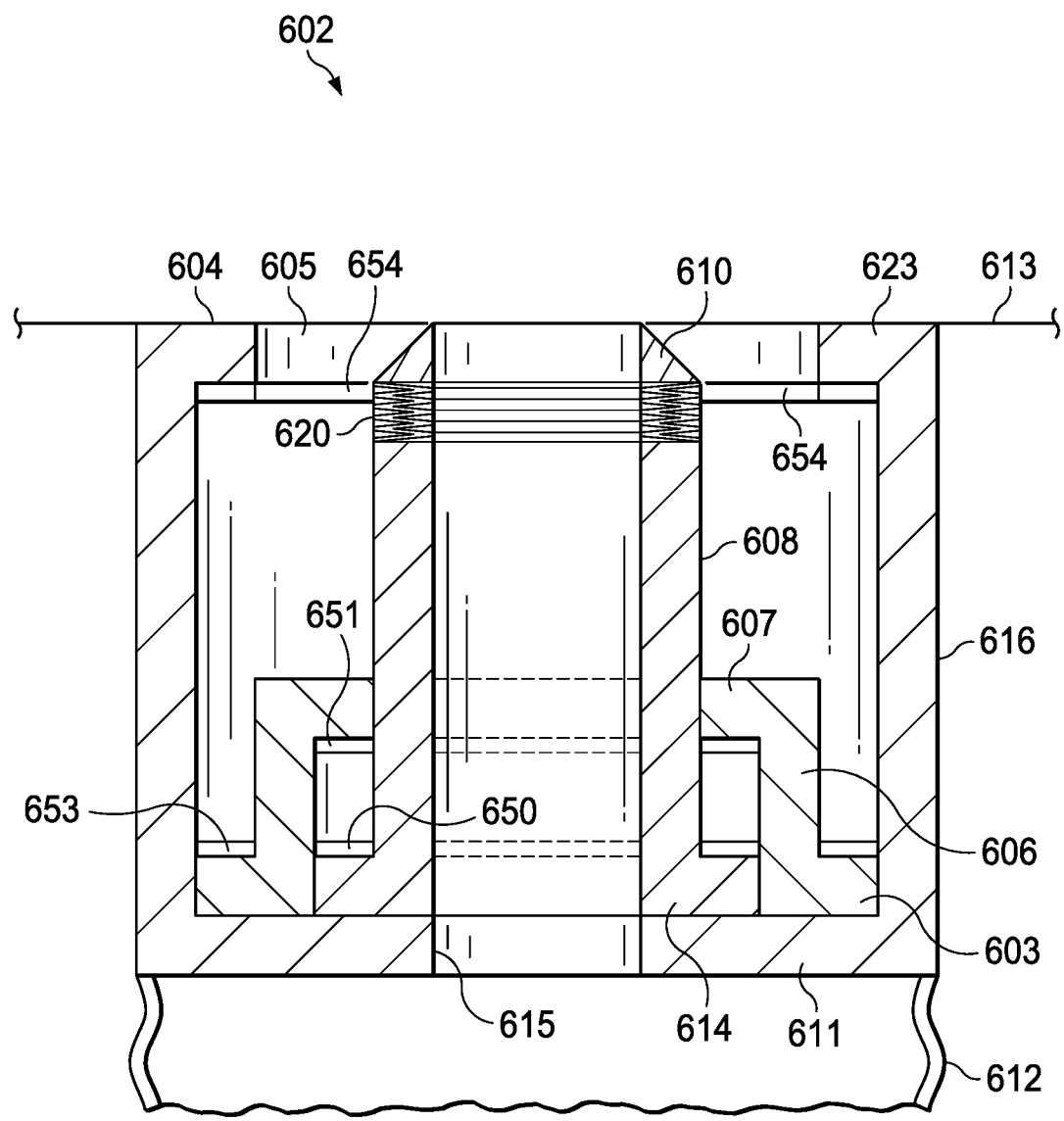
FIG. 6B is a cut away view along line 6-6 of FIG. 6A of an alternate embodiment in stowed position.

Referring to FIG. 6B, duct system 602 is shown in a stowed position. Flex nozzle 610 is collapsed in a stowed position. Flex nozzle 610 is connected to second vertical stanchion 608 and is held in ducted communication with retaining flange 614. Second vertical stanchion 608 is nested within first vertical stanchion 606 and retained in place by retaining flanges 607 and 614. First vertical stanchion 606 is nested within storage chamber 616 and retained in place by retaining flanges 603 and 623. Second vertical stanchion 608 and first vertical stanchion 606 are retained within storage chamber 616 by retaining flange 611. Retaining flange 607 includes flat cylindrical ferrous collar 651, on its lower surface. Ferrous collar 651 is preferably a thin magnetic steel alloy, bonded to the lower surface of retaining flange 607 by a suitable adhesive. Retaining flange 614 further comprises a flat cylindrical magnetic collar 650 bonded to it upper surface by a suitable adhesive. The magnetic collar is preferably a neodymium rare earth magnet strip. Retaining flange 603 further includes flat cylindrical magnetic collar 653 bonded to its upper surface. Retaining flange 623 further includes a flat cylindrical ferrous collar 654 bonded to its lower surface by a suitable adhesive. In another embodiment, the positions of the magnetic collars and the ferrous collars may be reversed. In another embodiment, the ferrous collars may be replaced by magnetic collars in a complementary polarization position. In another embodiment, the magnetic and ferrous collars are not present, and the stanchions are held in place by an interference fit in the extended position.

Retaining flange 611 forms duct opening 615 which is in ducted communication with cabin air supply duct 612. In the stowed position, the duct system is entirely contained within storage chamber 616 and flex nozzle 610 is held flush with cabin floor 613.

Figure 6C:
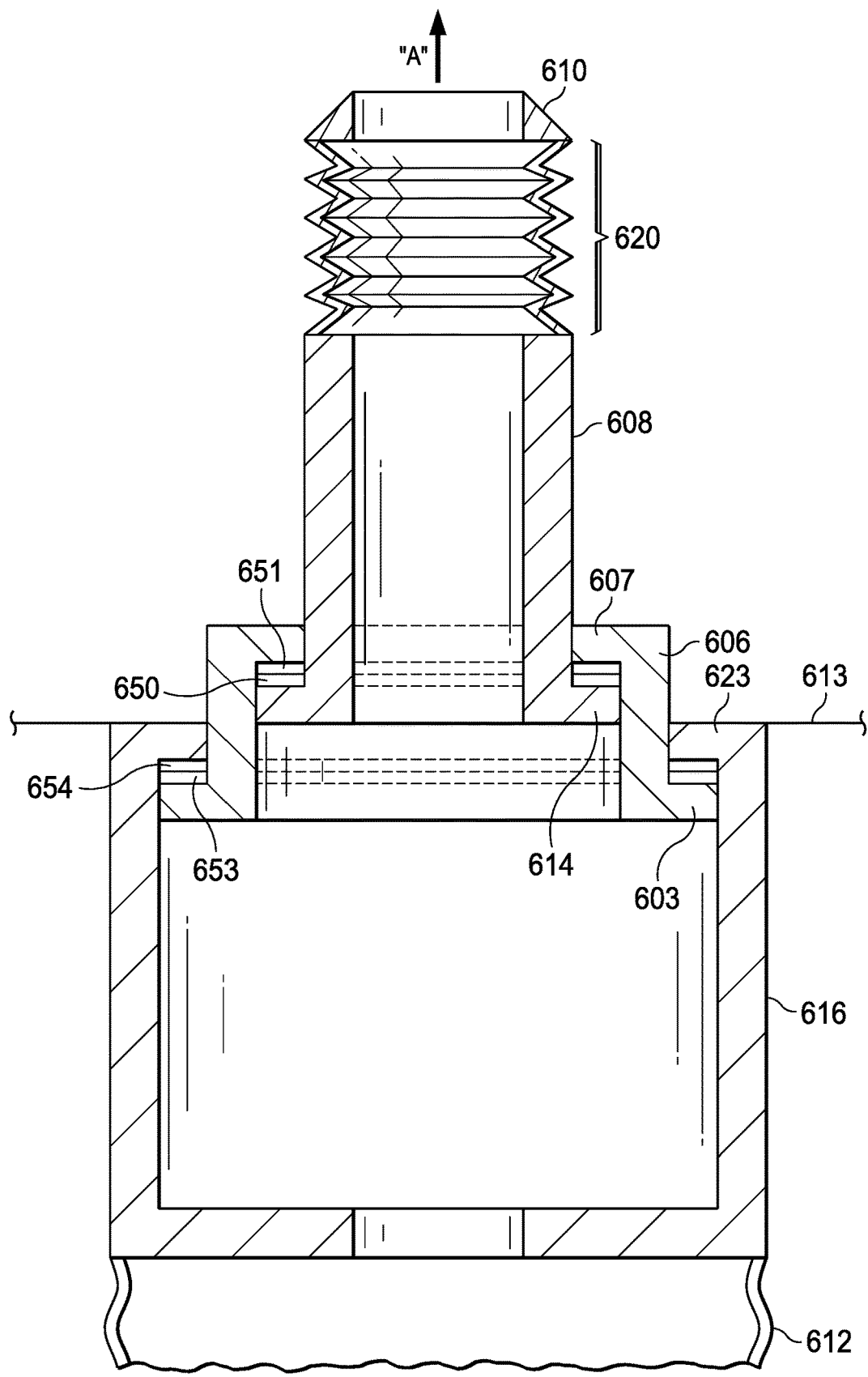
FIG. 6C is a cut away view along line 6-6 of FIG. 6A of an alternate embodiment in extended position.

Referring to FIG. 6C, to raise the system into an extended position, a force is applied shown by Arrow "A" to flex nozzle 610 thereby extending flexible section 620 away from second vertical stanchion 608. Second vertical stanchion 608 is telescoped within first vertical stanchion 606 until first vertical stanchion 606 is telescoped upward through storage chamber 616. When the duct system is in its extended position, magnetic collar 650 engages ferrous collar 651 to hold second vertical stanchion 608 in an extended position. Likewise, magnetic collar 653 engages ferrous collar 654 to hold first vertical stanchion 606 in place.

Figure 6D:
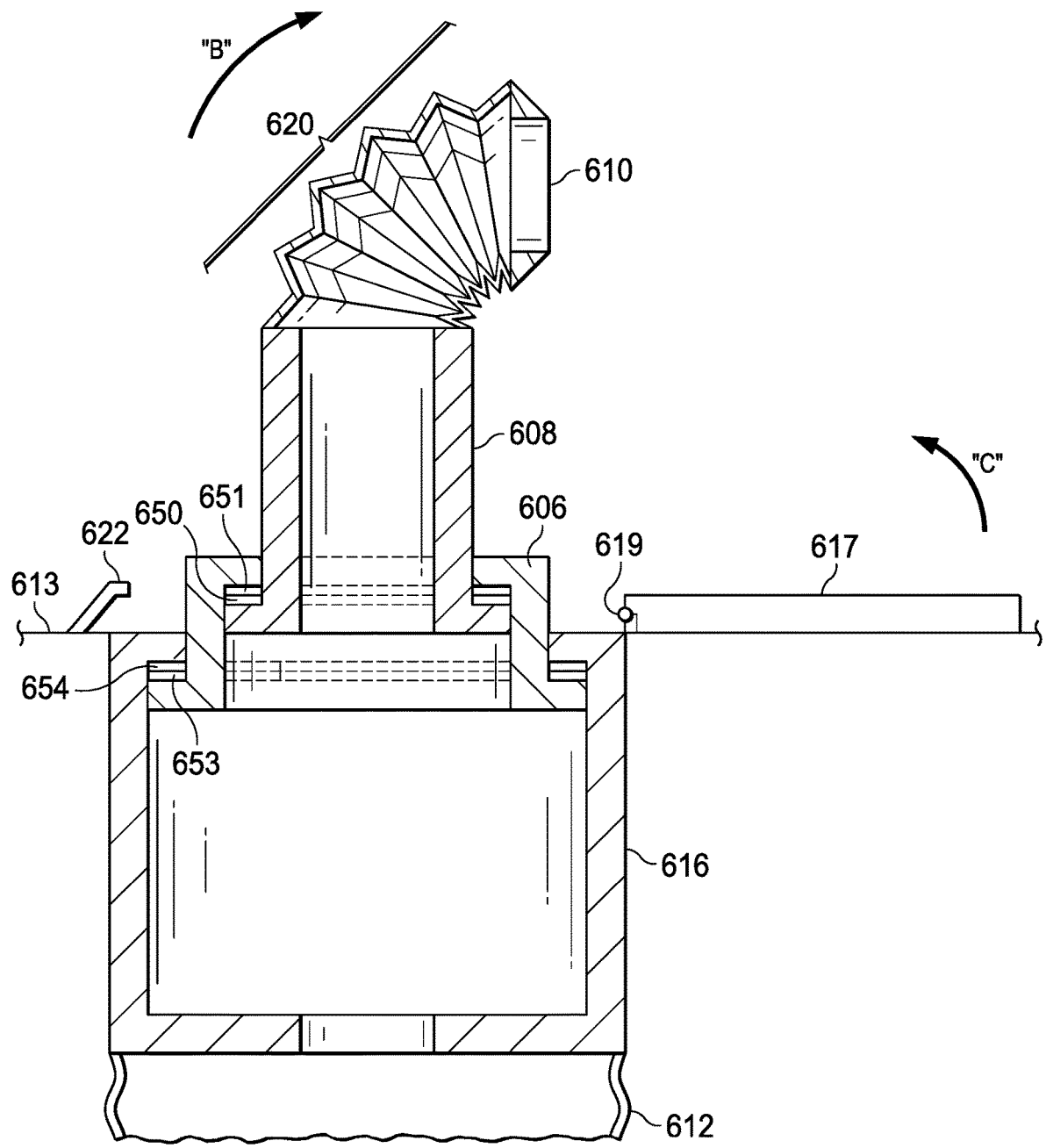
FIG. 6D is a cut away view along line 6-6 of FIG. 6A of an alternate embodiment in directed position.

Referring to FIG. 6D, flexible section 620 is then rotated in direction "B" and is held in place by the memory of its corrugated construction. The flexible section is "multi-directional" and can be repositioned in a virtually unlimited set of configurations. In order to direct cabin air forward or aft.

Storage hatch 617 is connected to storage chamber 616 by hinge 619. In one embodiment, storage hatch 617 is a flat plate and is configured to match the cabin floor and so prevents air flow from the duct into the cabin when in the stowed position. When the duct system is in extended position, storage hatch 617 lies adjacent cabin floor 613. When the duct system is in stowed positioned, storage hatch 617 is rotated in direction "C" until it engages closure latch 622. In another preferred embodiment, storage hatch 617 includes a ducted vent to allow free flow of environmental air from the cabin supply through the vertical stanchion in stowed position and into the cabin.

Figure 6E:
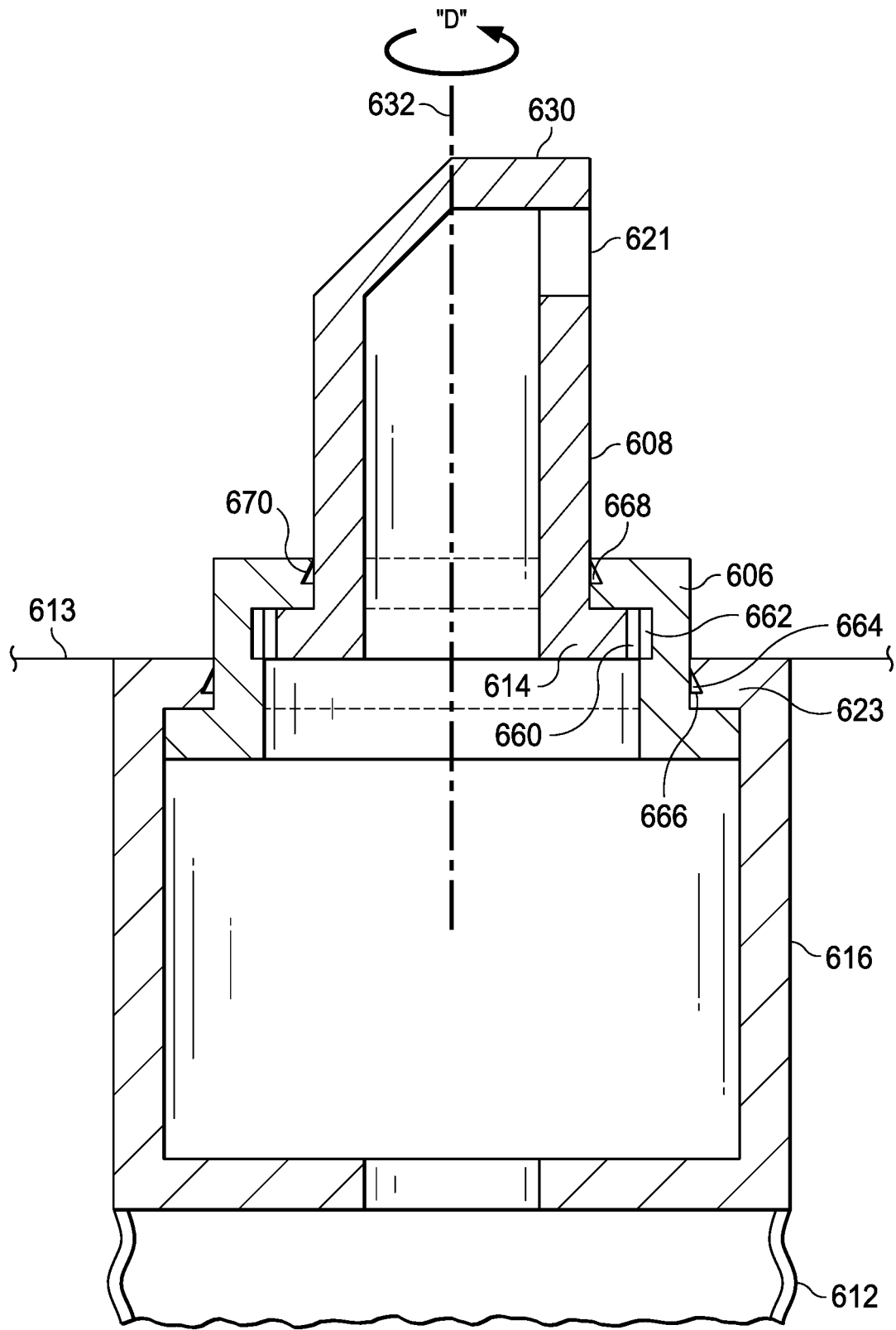
FIG. 6E is a cut away view of an alternate embodiment in extended position

Referring to FIG. 6E, an alternate configuration is shown. Fixed 90° nozzle 630 is attached to second vertical stanchion 608. Fixed 90° nozzle 630 forms fixed 90° exit nozzle 621. Second vertical stanchion 608 may be rotated 360° in direction "D" about central vertical axis 632 with respect to first vertical stanchion 606 thereby directing fixed 90° exit nozzle 621 in various directions.

Retaining flange 614 includes extended radial serrations 660. In a preferred embodiment, the radial serrations are equidistantly placed around the circumference of the retaining flange at 10° increments. Other equally spaced increments may be used. The interior surface of first vertical stanchion 606 includes radial indentions 662. Radial indentions 662 are designed to accommodate radial serrations 660 and therefore are likewise placed at 10° intervals around the interior of the first vertical stanchion. Equally spaced indentions at other intervals may be used so long as they mate with the radial serrations.

When the duct is in the extended position, radial serrations 660 engage radial indentions 662 in a releasable fashion allowing second vertical stanchion 608 to be locked into various radial positions with respect to first vertical stanchion 606.

In this embodiment, second vertical stanchion 608 is provided with circumferential locking ring 668 around its exterior perimeter. The locking ring in this embodiment has a vertically oriented triangular cross-section. First vertical stanchion 606 is provided with circumferential locking indention 670 on its interior surface. The locking indention is provided with a triangular cross-section adapted to mate with locking ring 668. Likewise, first vertical stanchion 606 is further provided with circumferential locking ring 664 on its exterior surface, having a vertically oriented triangular cross-section. Retaining flange 623 is provided with circumferential locking indention 666 on its interior surface with a cross-section designed to mate with locking ring 664. Other mating cross sectional shapes may be employed.

Locking ring 668 releasably engages locking indention 670 and locking ring 664 releasably engages locking indention 666 in order to hold the first vertical section and the second vertical section in an extended position.

Figure 6F:
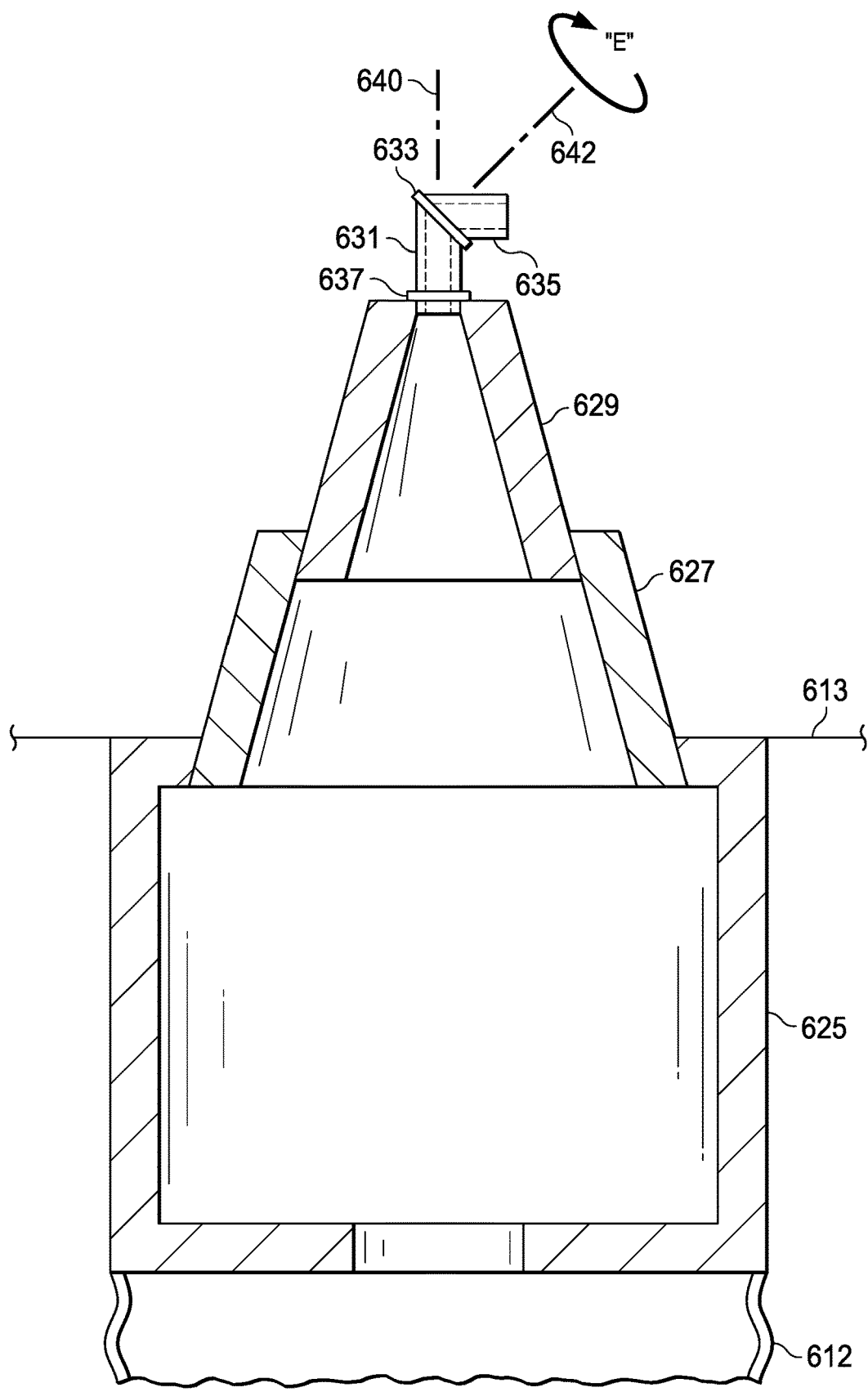
FIG. 6F is a cut away view of an alternate embodiment in extended position.

Referring to FIG. 6F, an alternate configuration is shown. Storage chamber 625 is in ducted communication with cabin air supply duct 612. First frustoconical stanchion 627 is nested within and extends from storage chamber 625. Second frustoconical stanchion 629 is nested within and extends from first frustoconical stanchion 627. Nozzle 635 is connected to second frustoconical stanchion 629 by rotary collar 637. Rotary collar 637 allows nozzle 635 to be rotated with respect to second frustoconical stanchion 629 about longitudinal axis 640. Nozzle 635 comprises an upper section connected to a lower section 631 by rotary collar 633 which allows rotation of the upper section relative to the lower section along an axis perpendicular to the collar in, for example, direction "E." The nozzle is shown in a 90° or horizontal position. The nozzle is stored in a 0° or vertical position. The frustoconical sections are held in position by interference fits when extended. First frustoconical stanchion 627, second frustoconical stanchion 629, and nozzle 635 all collapse within storage chamber 625 in a stowed position. In other embodiments, there may be a fewer or greater number of frustoconical stanchions.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

The invention claimed is:

1. A duct system for redirecting cabin supply air from a floor vent in a floor of an aircraft comprising:
a storage chamber, in ducted communication with a source of cabin supply air, configured to be positioned below the floor vent;
a first vertical stanchion in ducted communication with the storage chamber;
a second vertical stanchion in ducted communication with the first vertical stanchion and in ducted communication with the storage chamber;
an angular nozzle connected to the second vertical stanchion;
wherein the first vertical stanchion and the second vertical stanchion are capable of moving from a stowed position within the storage chamber to an extended position outside the storage chamber;
wherein the second vertical stanchion is rotatable with respect to the storage chamber about a vertical axis;
wherein the first vertical stanchion further comprises a set of radial indentions;
the second vertical stanchion further comprises a set of radial serrations;
wherein the set of radial serrations engage the set of radial indentions, when in the extended position;
the first vertical stanchion further comprises a first locking ring and a first locking indention;
the second vertical stanchion further comprises a second locking ring;
the storage chamber further comprises a second locking indention;
wherein the first locking ring releasably engages the second locking indention; and
the second locking ring releasably engages the first locking indention, when in the extended position.

2. The duct system of claim 1, wherein:
the first locking ring has a first vertically oriented triangular cross-section;
the second locking ring has a second vertically oriented triangular cross-section;
the first locking indention has a third vertically oriented cross-section; and
the second locking indention has a fourth vertically oriented cross-section.

3. The duct system of claim 1, wherein:
the first locking ring and the second locking indention form a first releasable latch; and
the second locking ring and the first locking indention form a second releasable latch.

4. The duct system of claim 1, wherein the angular nozzle further comprises:
a fixed 90° nozzle opening; and
an angular redirection surface, integrally formed with the second vertical stanchion, adjacent the fixed 90° nozzle opening.

5. A duct system for redirecting cabin supply air from a floor vent in a floor of an aircraft comprising:
a storage chamber, in ducted communication with a source of cabin supply air, configured to be positioned below the floor vent;
a first vertical stanchion in ducted communication with the storage chamber;
a second vertical stanchion in ducted communication with the first vertical stanchion and in ducted communication with the storage chamber;
an angular nozzle connected to the second vertical stanchion;
wherein the first vertical stanchion and the second vertical stanchion are capable of moving from a stowed position within the storage chamber to an extended position outside the storage chamber;
wherein the second vertical stanchion is rotatable with respect to the storage chamber about a vertical axis;
wherein the first vertical stanchion further comprises a set of radial indentions;
the second vertical stanchion further comprises a set of radial serrations;
wherein the set of radial serrations engage the set of radial indentions, when in the extended position;
a first flange extending from the storage chamber for engagement with a second flange extending from the first vertical stanchion; and
a third flange extending from the second vertical stanchion for engagement with a fourth flange extending from the first vertical stanchion;
wherein the first flange abuts the second flange and the third flange abuts the fourth flange, when in the extended position.

6. The duct system of claim 5, wherein:
the set of radial serrations is spaced at about 10° radial increments on an exterior surface of the third flange; and
the set of radial indentions is spaced at about 10° radial increments on an interior surface of the first vertical stanchion.

7. A method of redirecting cabin supply air from a floor vent in a floor of an aircraft comprising:
providing a storage chamber, in ducted communication with a source of cabin supply air, configured to be positioned below the floor vent;
providing a first vertical stanchion in ducted communication with the storage chamber;
providing a second vertical stanchion in ducted communication with the first vertical stanchion and in ducted communication with the storage chamber;
providing an angular nozzle connected to the second vertical stanchion;
moving the first vertical stanchion and the second vertical stanchion from a stowed position within the storage chamber to an extended position outside the storage chamber;
providing a fixed 90° nozzle opening in the angular nozzle; and
providing an angular redirection surface, integrally formed with the second vertical stanchion, adjacent the fixed 90° nozzle opening.

8. The method of claim 7, wherein the step of providing the first vertical stanchion further comprises providing the first vertical stanchion with a first cylindrical hollow cross-section and the step of providing the second vertical stanchion further comprises providing the second vertical stanchion with a second cylindrical hollow cross-section.

9. The method of claim 7, further comprising:
rotating the second vertical stanchion, with respect to the storage chamber, about a vertical axis.

10. The method of claim 7, further comprising:
providing the first vertical stanchion with a set of radial indentions;
providing the second vertical stanchion with a set of radial serrations; and
engaging the set of radial serrations with the set of radial indentions, when the first vertical stanchion and the second vertical stanchion are in the extended position.

11. The method of claim 10, wherein:
spacing the set of radial serrations at about 10° radial increments on an exterior surface of a third flange; and
spacing the set of radial indentions at about 10° radial increments on an interior surface of the first vertical stanchion.

12. A method of redirecting cabin supply air from a floor vent in a floor of an aircraft comprising:
providing a storage chamber, in ducted communication with a source of cabin supply air, configured to be positioned below the floor vent;
providing a first vertical stanchion in ducted communication with the storage chamber;
providing a second vertical stanchion in ducted communication with the first vertical stanchion and in ducted communication with the storage chamber;
providing an angular nozzle connected to the second vertical stanchion;
moving the first vertical stanchion and the second vertical stanchion from a stowed position within the storage chamber to an extended position outside the storage chamber;
wherein the step of providing the first vertical stanchion further comprises providing a first locking ring and a first locking indention on the first vertical stanchion;
wherein the step of providing the second vertical stanchion further comprises providing a second locking ring on the second vertical stanchion;
wherein the step of providing the storage chamber further comprises providing a second locking indention on the storage chamber;
releasably engaging the first locking ring and the second locking indention; and
releasably engaging the second locking ring and the first locking indention.

13. The method of claim 12, wherein:
providing the first locking ring as a first vertically oriented triangular cross-section;
providing the second locking ring as a second vertically oriented triangular cross-section;
providing the first locking indention as a third vertically oriented triangular cross-section; and
providing the second locking indention as a fourth vertically oriented triangular cross-section.

14. The method of claim 12, wherein:
forming a first releasable latch with the first locking ring and the second locking indention; and
forming a second releasable latch with the second locking ring and the first locking indention.

15. A method of redirecting cabin supply air from a floor vent in a floor of an aircraft comprising:
providing a storage chamber, in ducted communication with a source of cabin supply air, configured to be positioned below the floor vent;
providing a first vertical stanchion in ducted communication with the storage chamber;
providing a second vertical stanchion in ducted communication with the first vertical stanchion and in ducted communication with the storage chamber;
providing an angular nozzle connected to the second vertical stanchion;
moving the first vertical stanchion and the second vertical stanchion from a stowed position within the storage chamber to an extended position outside the storage chamber;
providing a first flange, extending from the storage chamber, for engagement with a second flange, extending from the first vertical stanchion;
providing a third flange, extending from the second vertical stanchion, for engagement with a fourth flange, extending from the first vertical stanchion;
abutting the first flange with the second flange; and
abutting the third flange with the fourth flange.

* * * * *